United States Patent
Guerra et al.

(10) Patent No.: US 11,947,973 B1
(45) Date of Patent: Apr. 2, 2024

(54) SYSTEMS AND METHODS FOR AUDITING DATA PROCESSING OPERATIONS

(71) Applicant: United Services Automobile Association (USAA), San Antonio, TX (US)

(72) Inventors: Oscar Guerra, San Antonio, TX (US); Megan Sarah Jennings, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 178 days.

(21) Appl. No.: 17/473,562

(22) Filed: Sep. 13, 2021

Related U.S. Application Data (60) Provisional application No. 63/084,940, filed on Sep. 29, 2020.

(51) Int. Cl.
*G06F 9/445* (2018.01)
*G06F 9/54* (2006.01)

(52) U.S. Cl.
CPC .......... *G06F 9/44505* (2013.01); *G06F 9/541* (2013.01)

(58) Field of Classification Search
CPC .............................. G06F 9/44505; G06F 9/541
See application file for complete search history.

(56) References Cited

U.S. PATENT DOCUMENTS

| | | | |
|---|---|---|---|
| 6,848,016 B2* | 1/2005 | Chue | G06F 13/14 710/22 |
| 7,051,327 B1* | 5/2006 | Milius | G06F 8/65 717/173 |
| 10,915,447 B1* | 2/2021 | Yau | G06F 12/0815 |
| 11,061,534 B2* | 7/2021 | Kim | G06F 3/0482 |
| 2011/0249593 A1* | 10/2011 | Jung | H04N 21/436 370/254 |
| 2013/0263104 A1* | 10/2013 | Baset | G06F 8/70 717/168 |
| 2016/0070741 A1* | 3/2016 | Lin | G06F 16/183 707/638 |
| 2018/0375638 A1* | 12/2018 | Khanna | H04L 9/0894 |
| 2019/0121760 A1* | 4/2019 | Arndt | G06F 13/24 |
| 2019/0250780 A1* | 8/2019 | Feng | G06Q 10/101 |
| 2020/0027033 A1* | 1/2020 | Garg | G06F 17/18 |
| 2021/0105324 A1* | 4/2021 | Iwata | H04L 67/12 |

* cited by examiner

*Primary Examiner* — Faisal M Zaman
(74) *Attorney, Agent, or Firm* — Fletcher Yoder, PC (57) ABSTRACT

The present disclosure is related to a system that may include a first computing device that may perform a plurality of data processing operations and a second computing device that may receive a modification to one or more components of a first data operation, identify a first subset of the plurality of data processing operations that corresponds to the one or more components, and determine one or more alternate parameters associated with the one or more components. The second computing device may then identify a second subset of the plurality of data processing operations that corresponds to the one or more alternate parameters and send a notification to the first computing device indicative of a modification to the first subset and the second subset.

19 Claims, 2 Drawing Sheets

SYSTEMS AND METHODS FOR AUDITING DATA PROCESSING OPERATIONS

CROSS-REFERENCE TO RELATED APPLICATIONS

This patent claims benefit of and priority to U.S. Provisional Patent Application Ser. No. 63/084,940, filed on Sep. 29, 2020, which is herein incorporated by reference in its entirety for all purposes.

BACKGROUND

The present disclosure relates generally to providing improving processes undertaken in data processing operations. More specifically, the present disclosure relates to analyzing changes made to certain data processing operations to ensure that the changes are implemented throughout an enterprise system.

As data operations across an enterprise network becomes increasingly dependent on each other, data auditing operations ensure that the interdependent components operate using correct or consistent data. However, as data operations and databases become more complex, the respective data auditing operations are increasingly difficult to manage and track. As such, improved systems and methods for auditing data processing operations are desired.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a first computing device that may perform a plurality of data processing operations and a second computing device that may receive a modification to one or more components of a first data operation. The second computing device may also identify a first subset of the plurality of data processing operations that corresponds to the one or more components and determine one or more alternate parameters associated with the one or more components. The second computing device may then identify a second subset of the plurality of data processing operations that corresponds to the one or more alternate parameters and send a notification to the first computing device indicative of a modification to the first subset and the second subset.

In another embodiment, a method may include receiving, via at least one processor, a modification to one or more components associated with a first data operation being executed and identifying, via the at least one processor, one or more data processing operations being performed by one or more computing devices. The one or more data processing operations may include the one or more components. The method may then involve determining, via the at least one processor, one or more alternate parameters associated with the one or more components and sending, via the at least one processor, one or more notifications to the one or more computing devices. The notifications may be indicative of the modification, the one or more alternate parameters, and the one or more data processing operations.

In yet another embodiment, a non-transitory computer-readable medium may include instructions that, when executed, may cause a processor to perform operations that may include receiving a modification to one or more components associated with a first data operation being executed and identifying one or more data processing operations being performed by one or more computing devices. The one or more data processing operations may include the one or more components. The operations may then involve determining one or more alternate parameters associated with the one or more components and sending one or more notifications to the one or more computing devices. The notifications may be indicative of the modification, the one or more alternate parameters, and the one or more data processing operations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Present embodiments of the disclosure are directed to identifying variables (e.g., variable names, tags, formulas) in code (e.g., data processing or batch operations) that have been updated in one computing system and are used in other computing systems. This may be beneficial when attempting to update or analyze numerous separate batch operations that utilize information with differing names for the variables used to identify the information. For example, in information technology (IT) data auditing operations, formula changes may be designed for certain variables (e.g., handle time). However, different tag names (e.g., up time) may be generated for the same variable by other users. These different names or identifiers for the same variable may make it difficult to identify variables that should be updated in different code routines used for different operations. For example, "handle time" may be tagged as "uptime" or "handel time" (with a misspelling of "handle") by different users intending to refer to the same, "handle time" variable.

To identify these different variables and ensure that the different variables are attributed to the same variable, present embodiments described herein may utilize an audit system to determine or identify relevant tag names or parameters that may be attributable to the same variable. That is, the audit system may use machine learning algorithms or other identifying techniques to identify tag names that have different names, descriptors, or identifiers (e.g., misspelled or completely different versions of a designated tag) used in different codes, parts of the formulas, and the like. These identified tags may be highlighted by the audit system, such that the audit system provides a notification or recommendation to another computing system to change the identified tag name to correspond to the desired or correct tag name. In this way, the audit system may provide a notification related to discrepancies between identified tag names due to syntax, spelling, and other errors that may affect other datasets, formulas, queries, and the like.

By way of example, the audit system may identify relevant tag names by searching for names or related names as recorded in a database based on historical correlations between different tag names, typical misspellings of tag names, and the like. In some embodiments, the audit system may use an updated formula to other formulas or functions that may use the same identified tag name to identify related tag names. For example, if "handle time" is defined by variables A (wait time), B (conversation time), and C (reporting time), and "uptime" is also defined by A, B, and C, then the audit system may identify "handle time" and "uptime" as being the same. After identified as being similar to the identified tag name, the correlative tag names may be added to the database for future identification operations.

By identifying and updating related tag names in various formulas and functions performed by a computing system, the audit system may improve the operation of the computing system by reducing instances in which the computing system may execute tasks that are based on erroneous formulas and/or functions due to the invalid tag names. Indeed, the embodiments described herein are directed toward an improvement in computer technology with regard to complex and highly integrated enterprise system that rely on consistent naming conventions and parameter values to provide valuable analysis data. By automatically identifying and correcting the tag and variable names, the computing system may reduce inefficient processing times by avoiding processing functions that are based on invalid parameters.

Moreover, the present embodiments described below use a limited set of rules or steps in a process specifically designed to achieve an improved technological result with regard to performing certain functions and processes stored in an enterprise system. Additional details with regard to auditing data operations will be discussed below with reference to FIGS. 1-4.

Figure 1:
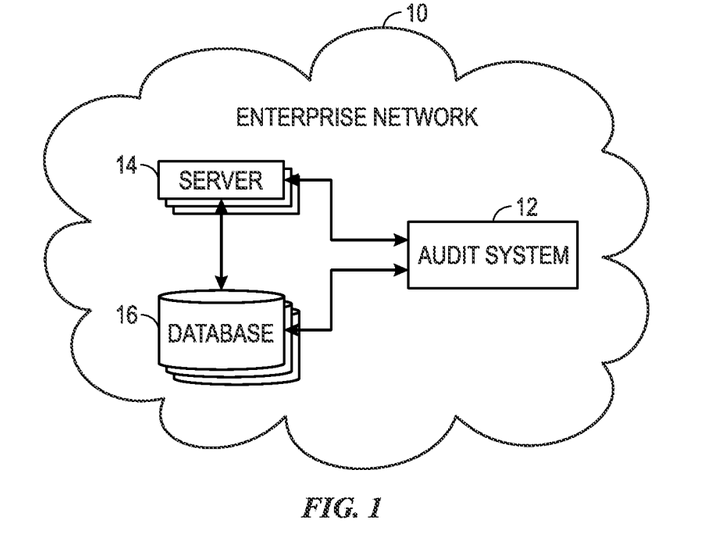
FIG. 1 illustrates a block diagram of a system for analyzing data processing or batch operations in an enterprise network, in accordance with embodiments described herein.

By way of introduction, FIG. 1 illustrates a block diagram of a system for auditing data operations being performed by various computing systems using an audit system 12. The audit system 12 may include an enterprise network 10 that communicates with server devices 14, databases 16, and the like. The audit system 12 may communicate with other devices using a variety of communication protocols. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The enterprise network 10 may be a network operated by an organization (e.g., a bank, an insurance company, or a financial group). For example, the enterprise network 10 may be a private network, such as local area network (LAN) that includes a variety of computing and network devices including, but are not limited to, switches, servers (e.g., processors), storage (e.g., memory) and routers. The enterprise network 10 may include restrictions and access rules established to relegate access to selected users (e.g., clients, employees, third party service providers, regulatory representatives). The organization may use the enterprise network 10 to provide a variety of services for the clients. In some embodiments, the enterprise network may be off site (e.g., in a cloud or the like).

In one embodiment, an organization (e.g., a bank) may use the enterprise network 10 to provide online banking services, such as checking and saving accounts, debit and credit cards and other payment services, mortgage loans, and investment management, and the other personal banking related services. Such services may be provided as service applications (e.g., web browser applications, mobile applications). The organization may include a banking department providing the clients with personal checking and/or saving services. The personal checking and/or saving services may be hosted and managed on service devices 14, which may include one or more computing systems and one or more storage components (e.g., database, memory, storage). The server devices 14 may provide support for running personal checking and/or saving related applications. Indeed, data processes (e.g., computing batch operations) may be processed by the one or more server devices 14, and the results of the processing may be stored in the databases 16 or the like.

The organization may also include payment services such as a debit and credit cards department providing the clients with debit and credit cards services, a mortgage loan department providing the clients with mortgage loan services, and other services. It should be noted that the organization described herein includes references to certain services, the embodiments described herein are not limited to the described organization. Indeed, the embodiments described herein may be performed within any suitable enterprise system. Additionally, or alternatively, the organization may use the server devices 14 to provide data services (e.g., storage, backup, data analysis, computation, modeling, data mining, or machine learning) for service departments (such as the banking department, the debit and credit cards department, the mortgage loan department, and/or the investment department).

Keeping this in mind, the organization may include multiple departments running services via the server devices 14 (e.g., in a cloud, such as a private cloud, a public cloud, or a hybrid cloud). In some embodiments, the server devices 14 may perform data processing operations, such as batch processing tasks to maintain real-time data for various operational tasks. For example, when tracking an average amount of time that service representatives use to resolve customer issues over the phone, a formula may be used by multiple server devices 14 to track the amount of time each service representative uses. The amount of time may be designated as a variable, "handle time," which may be defined as a formula that involves the sum of a "hold time" and a "discussion time." To keep a running average of the average amount of time that each service representative of each department uses during a phone call, each server device 14 may periodically (e.g., every hour, day, week) calculate a value for the handle time variable using the same formula.

To ensure that data values across an organization are processed in the same manner, each server device 14 may include instructions to calculate the handle time variable using the same formula. However, if the formula is changed for use by a user of one server device 14 to represent a different value (e.g., "hold time," "discussion time," and "survey time"), the other server devices 14 may continue to calculate the handle time variable using a different formula, thereby skewing the results.

With the foregoing scenario in mind, the audit system 12 may track changes made to various data processing operations and notify other server devices 14 regarding the change. In some embodiments, the audit system 12 may query each server device 14 when the respective server device 14 is performing its batch processing operations to ensure that each updated variable, formula, tag name, or other data processing item is accurately updated. That is, for example, during times in which the server devices 14 are performing batch processing operations, which involve performing high-volume, repetitive data processing operations, the audit system 12 may query a batch operation that is being executed by a respective server device 14 to update the respective operation. Alternatively, the audit system 12 may generate a notification that may be presented to a user (e.g., administrator) of the server device 14 to notify the user regarding the changes.

Referring back to FIG. 1, the databases 16 may be any suitable storage component that stores data for processing by the server devices 14 or the like. In some embodiments, formula definitions, function operations, data values, and other items used for data processing operations may be stored in the databases 16. With this in mind, the audit system 12 may query the databases 16 to determine whether detected changes to data operations are reflected in the database 16.

Figure 2:
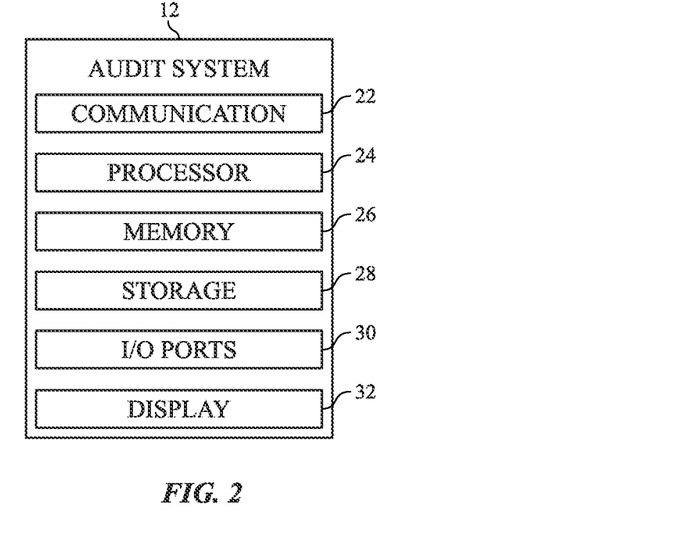
FIG. 2 illustrates a block diagram an audit system in the enterprise network of FIG. 1, in accordance with embodiments described herein.

Referring now to FIG. 2, a block diagram of example components of the audit system 12 is illustrated. For example, the audit system 12 may include a communication component 22, a processor 24, a memory 26, a storage 28, input/output (I/O) ports 30, a display 32, and the like. The communication component 22 may facilitate communication between the audit system 12 and the other devices depicted in FIG. 1, such as the server devices 14 and the databases 16. Additionally, the communication component 22 may facilitate data transfer to the audit system 12, such that the audit system 12 may receive data from the other devices depicted in FIG. 1 and the like.

The processor 24 may be any type of computer processor or microprocessor capable of executing computer-executable code. The processor 24 may also include multiple processors that may perform the operations described below.

The memory 26 and the storage 28 may be any suitable articles of manufacture that can serve as media to store processor-executable code, data, or the like. These articles of manufacture may represent computer-readable media (e.g., any suitable form of memory or storage) that may store the processor-executable code used by the processor 24 to perform the presently disclosed techniques. The memory 26 and the storage 28 may also be used to store data described, various other software applications for analyzing the data, and the like. The memory 26 and the storage 28 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

The I/O ports 30 may be interfaces that may couple to other peripheral components such as input devices (e.g., keyboard, mouse), sensors, input/output (I/O) modules, and the like. The display 32 may operate to depict visualizations associated with software or executable code being processed by the processor 24. In an embodiment, the display 32 may be a touch display capable of receiving inputs from a user of the audit system 12. The display 32 may be any suitable type of display, such as a liquid crystal display (LCD), plasma display, or an organic light emitting diode (OLED) display, for example. Additionally, in an embodiment, the display 32 may be provided in conjunction with a touch-sensitive mechanism (e.g., a touch screen) that may function as part of a control interface for the audit system 12.

It should be noted that the components described above with regard to the audit system 12 are exemplary components and the audit system 12 may include additional or fewer components as shown. Moreover, the components described above in FIG. 2 may also be part of the server devices 14 of FIG. 1.

With the foregoing in mind, the audit system 12 may receive notifications from various server devices 14 each time a change has been made to a data processing component or function. The data processing components may include variable names, processing formulas, mapping operations, functions, and any suitable operation that may be performed using data values. By way of example, the server device 14 may receive changes or modifications to a formula used to perform a certain data processing operation. The server device 14 (e.g., an application or program being executing via the server device 14) may employ an application programming interface (API) or other suitable software tool that tracks changes to data processing operations. After detecting the change, the server device 14 may send a notification regarding the change, such that the audit system 12 may identify other server devices 14 or databases 16 that use the same updated component. In this way the audit system 12 may send commands or notifications to these other server devices 14 to update the respective data processing operations, thereby ensuring that similar data processing operations are performed in the same manner across the enterprise network 10.

Figure 3:
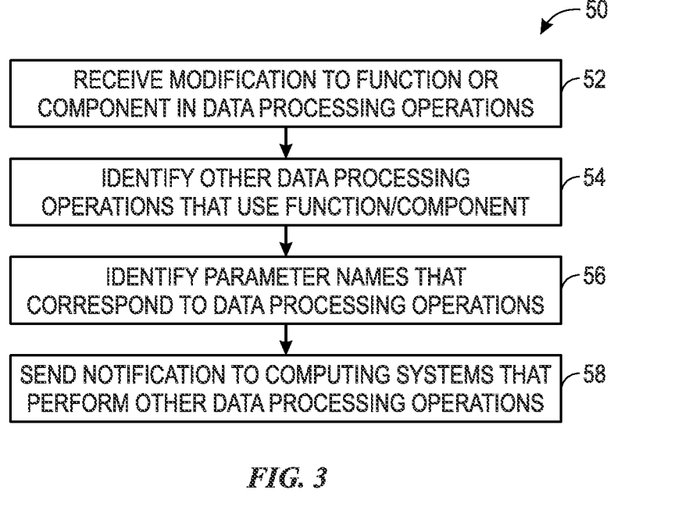
FIG. 3 illustrates a flow diagram of a method for sending notifications to computing systems based on identified changes to data processing operations, in accordance with embodiments described herein.

For example, FIG. 3 illustrates a flow diagram of a method 50 for notifying or adjusting data processing operations performed by certain devices in response to detecting a change made to a related data processing operation. Although the following description of the method 50 is described as being performed by the audit system 12, it should be noted that any suitable computing device or system may perform the embodiments described herein. Moreover, although the following description of the method 50 is described as being performed in a particular order, it should be noted that the method 50 may be performed in any suitable order.

Referring now to FIG. 3, at block 52, the audit system 12 may receive a notification of a modification to a component of a data processing operation. The notification or request for the modification may be received directly by the audit system 12 via a user that intends to update the same data processing operations for each server device 14 in the enterprise network 10. Additionally, the notification may be received by way of an API or programming operating on one server device 14 that receives or detects an input that changes a component of a data processing operation.

As discussed above, the data processing operations may include any suitable operation that is performed by the audit system 12, the server device 14, or any suitable computing device that is part of the enterprise network 10. For example, the data processing operations may include collecting datasets from various databases, applying functions (e.g., formulas) to the datasets, visualizing results (e.g., graphs, alerts) of the functions, and the like. The components of the data processing operations may include variable names, processing operations, functions, equations, mapping operations, storage locations, and other suitable data processing operations.

After receiving the notification of the change to the component of the data processing operation, at block 54, the audit system 12 may identify other data processing operations that may be related to the received notification. In one embodiment, the audit system 12 may parse the received notification to determine a tag name for the data processing operation that is updated. For example, referring again to the handle time variable mentioned above, the audit system 12 may query each server device 14 and database 16 to determine whether the handle time variable is used by any data processing operation performed by a server device 14 or stored in the database 16.

In some embodiments, a list of data processing operations performed by each server device 14 may be stored in a database or storage accessible to the audit system 12. As such, the audit system 12 may query the list to identify the server devices 14 or the databases 16 that references or uses the respective tag name for the data processing operation. The list may be dynamically updated by each server device 14, as changes are made to various data processing operations. Additionally, the audit system 12 may periodically query each server device 14 and database 16 for changes made to one or more data processing operations. That is, the server devices 14 and the databases 16 may update a memory location or data cell each time that a change is made to a data operation. In this way, the audit system 12 may efficiently identify the changes made to the data operations and update the list of all the changes periodically.

At block 56, the audit system 12 may identify parameter names that correspond to the data processing operations related to the notification received at block 52 or identified at block 54. That is, each data processing operation or component of the data processing operation may include a number of parameters, components, operators, and other items that may define the task performed by the respective data processing operation. As such, based on the parameters or components of the data processing operation that were modified, the audit system 12 may identify the corresponding data processing operations that use the modified parameters. In some embodiments, the audit system 12, the server devices 14, and the databases 16 may each update a memory location or data cell each time that a change is made to a parameter of a data operation as described above. Additionally, the audit system 12, the server devices 14, and the databases 16 may maintain or store a list of parameters that is used by various data processing operations. As a result, in some embodiments, the audit system 12 may search for naming alternatives as indicated in a database, which may store the relationships between names that are tracked based on historical correlations, common misspellings, common syntax errors, and the like.

In certain embodiments, when identifying the data processing operations and the parameters that are part of the data processing operations, the audit system 12 may modify the search parameters that it uses for its queries to include substitute names. The substitute names may be common synonyms or terms used for the same tag name, parameter name, or the like. The common synonyms may be stored in a memory or database as described above. Additionally, the audit system 12 may identify related names that include consistent offsets (e.g., mistyped names, plural form, misspelled names, typographical errors) from the tag name, parameter name, or other designator identified in blocks 54 and 56. For example, the audit system 12 may analyze the tag name or parameter name with respect to a model that tracks typing or spelling errors for certain words, names, or phrases. The model may be trained over a period of time using a machine learning algorithm that received indications regarding name changes. That is, in some embodiments, the audit system 12 may detect that a user has changed a name of a tag or parameter, such that a threshold amount (e.g., 90% of character positioning) of the name remained the same. Here, the audit system 12 may automatically determine that the name change corresponds to an alternate spelling or version of the previous name. In this case, the audit system 12 may send a notification regarding the change to the machine learning algorithm, which may modify a model to capture the relationship between the two names. As a result, the model may effectively assist the audit system 12 in identifying alternate names that correspond to the identified data processing operations or parameter names of blocks 54 and 56.

By way of example, some data processing operations may include formula changes that may be designed for certain variables (e.g., handle time). However, different tags may be generated for the same variable, which may make it difficult to identify where changes need to be made in different code routines. For example, "handle time" may be tagged as "uptime" or "handel time" (with a misspelling of "handle"). With this in mind, the audit system 12 may utilize the model generated by the machine learning algorithm to determine/identify relevant tags that may need to be identified as part of the formula change. That is, the model may assist the audit system 12 to identify tag names that have different names (e.g., misspelled or completely different versions of a designated tag). These identified tag names may be highlighted by the audit system 12, which may then provide a notification or recommendation to change the modified tag name to correspond to a more consistently (e.g., more than 50%) used tag name. In this way, syntax, spelling, and similar terms may be tracked for updates to formulas/queries.

In another example, the model may also be used to assist the audit system 12 to identify correlative variables. For example, if "handle time" is defined by variables A (wait time), B (conversation time), and C (reporting time), and "uptime" is also defined by A, B, and C, then the system might identify "handle time" and "uptime" as being the same (and in need of updating). After identified as corresponding to the relevant tag, the identified correlative tags may be stored in the historical database for future correlation.

As more datasets or tags are identified by more users, the identified datasets or tags may be incorporated into the model as training data for the machine learning algorithms. The machine learning algorithm may then continuously improve a confidence level for identifying corresponding data processing operations, tag names, parameter names, or the like.

After identifying the data processing operations and the parameter names using the variety of techniques described above, the audit system 12 may send a notification to one or more computing systems that use the identified tag names, data processing operations, parameter names, or the like. In some embodiments, the notification may cause the respective computing system to present a visual alert that may be a graphical input component that may receive an input (e.g., selection). The visual alert may indicate that a change has been made to a respective data processing operation. In response to receiving the alert, the computing system may automatically change the components or properties of the identified names based on the modification received at block 52. As a result, the various data processing operations performed on different server devices 14 may perform consistent operations, even as they are changed by one other operator.

In some embodiments, the visual alert will request that the user of the respective computing system indicate a recommendation to change the respective data processing operation based on the modification received at block 52. The user may then, in turn, approve or disapprove the modification, and the computing system may then incorporate the modification or not, based on the received approval.

With the foregoing in mind, it should be noted that, in some embodiments, the identification of data processing operations, tag names, parameter names, or the like may be determined after a certain amount of time has lapsed. That is, the audit system 12 may analyze datasets related to the changed data processing operations to determine whether changes occur to the results of the respective data processing operations after the modification was received at block 52.

For example, if the average call time is 10 minutes before the formula change for all calls and then changes to 7 minutes after the formula change, certain variables that were identified for updating may not have been correctly identified for updating because the variables did not correspond to each other. That is, if the update or modification to identified components cause the results in the respective data processing operations to change more than a threshold amount (e.g., 10%) after implementing the change, the audit system 12 may determine that the identified variables may have been incorrectly identified. The audit system 12 may send a notification to the respective computing system to notify the user of the incorrectly identified variables, such that the user of the computing system may determine whether the modification is indeed incorrect. In any case, the changes in the results of the data processing operations may be used as way for the audit system to verify that the modified data process operations were correctly modified. In other words, the audit system 12 may use a previous version of the data processing operation to determine whether similar or identical values are consistently calculated even after the identified variables are modified. In this way, variable names that are modified to achieve a more consistent representation across the enterprise network 10 may be safeguarded against changes made to variables that are intentionally named similar to another variable name, even when the variables are mistakenly identified by the audit system 12.

In addition, the audit system 12 may collect information regarding individuals performing searches related to identified components, data processing operations, parameter names, and the like. As such, when the audit system detects those similar searches are being performed, the audit system 12 may identify the individuals working on these components or data processing operations, such that the audit system 12 may provide an indication of contact information for each of the individuals working with the same data processing operations. As a result, the individuals working on the same data processing operations across the enterprise network 10 may contact one another to improve efficiencies and coordinate the changes to the same data processing operations. In some embodiments, the audit system 12 may provide details to each individual including work group and title to help the individuals understand the reasoning or rationale for the existence of an overlap and to better guide shared communications. For example, when performing a search, correlations may be identified between the type of data that one individual is searching with respect to previous searches performed by others. The audit system 12 send an alert to the individuals working on the same data operation processes based on the search queries and the identities of those searchers. By providing this information, more efficient analysis and research may be performed by the collection of individuals. The notifications provided by the audit system 12 may also let the searchers know the details of the user performing the search (e.g., the work group they are in) and/or reasons for their searches (e.g., as input into a data field by the searchers). As a result, the individuals may determine a change to the data processing operation to accommodate various users of the respective datasets or create different data processing operations for different purposes.

Figure 4:
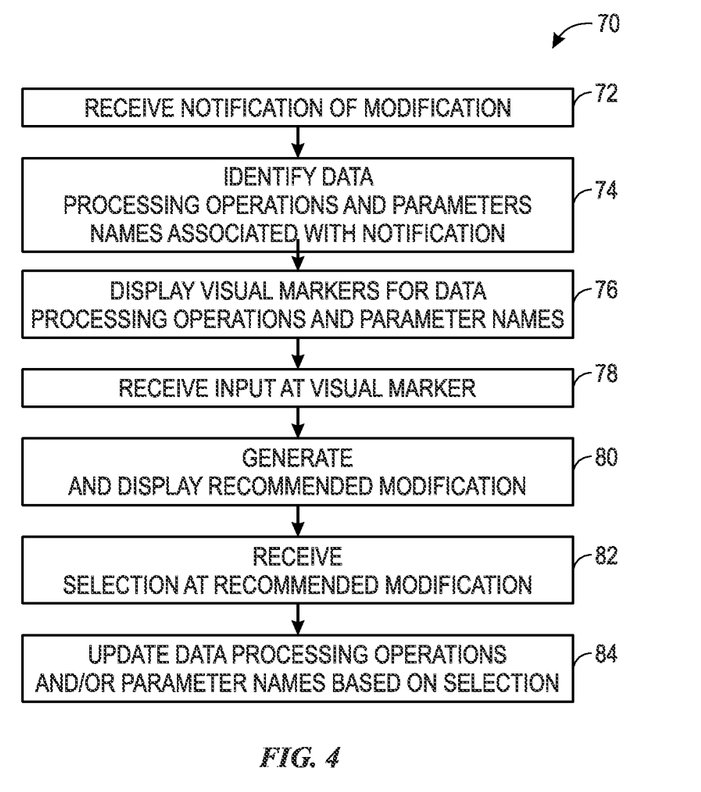
FIG. 4 illustrates a flow diagram of a method for presenting notifications related to identified changes to data processing operations, in accordance with embodiments described herein.

With the foregoing in mind, FIG. 4 illustrates a method 70 that the server device 14 or other suitable computing device may implement after receiving a notification of a modification to a component of a data processing operation from the audit system 12, as described above. Although the method 70 is described as being performed by the server device 14, it should be noted that any suitable computing system may perform the method 70. Moreover, although the method 70 is described in a particular order, it should be noted that the method 70 may be performed in any suitable order.

Referring now to FIG. 4, at block 72, the server device 14 may receive a notification regarding a modification to a data processing operation, a component of the data processing operation, or the like. In response receiving the notification, at block 74, the server device 14 may identify data processing operations, tag names, parameter names, and other identifying features associated with the notification. In some embodiments, the notification may be a message or update to a memory location that indicates that a change has been detected to a component of a data processing operation performed by the server device 14. As discussed above, the audit system 12 may identify components, tag names, data processing operations, parameter names, and other features that may match another data processing operation that has been modified.

Before implementing the modification to the respective component or data processing operations performed by the server device 14, the server device 14 may, at block 76, display one or more visual markers or notifications to notify a user of the server device 14 of the identified data processing operations or components. The visual markers may include a highlight, a comment box, or other suitable visual indicator that is produced adjacent to a field that corresponds to the identified parameter. In some embodiments, the visual marker may include a link that the server device 14 may use to access a memory location in a database or storage component, a data entry field of an application being executed via the server device 14, or the like that enables the user to access the identified component or data processing operation.

In any case, at block 76, the server device 14 may receive an input at the visual marker from the user. The input may include receiving a selection at a graphical icon that is representative of the visual marker. As discussed above, the input may cause the server device 14 to provide additional information regarding the notification.

At block 80, the server device 14 may generate and display a recommended modification to a respective component of the identified data processing operation. The recommended modification may correspond to modifying a tag name, a parameter name, a function, or some other aspect of a data processing operation to match a change detected by the audit system 12, as described above with respect to the method 50. In some embodiments, the recommendation may include an indication of the original version of the respective data processing operation and the recommended change to the data processing operation. In addition, the recommendation may include a link or an indication of the original change to the data processing operation detected by the audit system 12 (e.g., received at block 52). In this way, the user of the server device 14 may determine whether the recommended modification should be applied to the respective data processing operation performed by the server device 14.

At block 82, the server device 14 may receive a selection related to the recommended modification. That is, the user of the server device 14 may select to approve or disapprove the modification. In some embodiments, the recommended modification notification generated at block 80 may include an option to perform a custom change to the recommended modification. The server device 14 may also receive an input from the user regarding how the respective data processing operation should be changed.

At block 84, the server device 14 may update the respective data processing operation based on the selection received at block 82. It should be noted that the user may also select ignoring the recommendation provided at block 80, and thus the server device 14 may keep the respective data processing operation the same.

The technologies described in the disclosed embodiments include facilitating identification of particular variables in code (e.g., data processing operations) based on forward and backward correlations related to components or part of the code. In certain enterprise networks, the distribution of data processing operations across numerous computing devices may result in different users using the same data processing operations for different purposes. The present embodiments described herein may enable different computing systems to be notified in real time or near real time of changes made to a data processing operation that is used by other computing systems. In this way, the computing systems may operate more efficiently using the same data processing operation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
 a first computing device configured perform a plurality of data processing operations; and
 a second computing device configured to perform operations comprising:
 receiving a modification to one or more components associated with a first data operation being performed by the second computing device, wherein the first data operation is configured to apply one or more datasets to a function, and wherein the one or more components define the function;
 parsing the modification to determine one or more parameters of the one or more components, wherein the one or more parameters are representative of the one or more components;
 sending a query request to the first computing device to identify a first subset of the plurality of data processing operations based on the one or more parameters;
 determining one or more alternate parameters associated with the one or more parameters;
 sending an additional query request to the first computing device to identify a second subset of the plurality of data processing operations based on one or more alternate parameters, wherein the second subset and the first subset are configured to implement the function, and wherein the second subset and the first subset are distinct; and
 sending a notification to the first computing device, the notification is indicative of the modification, the first subset, and the second subset, wherein the notification is configured to cause the first computing device to implement the modification to one or more additional components associated with the first subset and the second subset in response to receiving the notification.

2. The system of claim 1, wherein the one or more alternate parameters comprise a modified version of a name that corresponds to each of the one or more parameters.

3. The system of claim 2, wherein the modified version of the name corresponds to an alternate spelling or a typographical error.

4. The system of claim 1, wherein the one or more components comprise one or more formulas performed by the first subset, the second subset, or both.

5. The system of claim 1, wherein the notification is further configured to cause the first computing device to display a visual alert indicative of the notification.

6. The system of claim 1, wherein the second computing device is configured to receive the modification via an application protocol interface (API) configured to detect a change to the first data operation performed by the second computing device.

7. The system of claim 1, comprising a database configured to store a list of the plurality of data processing operations performed by the first computing device, and wherein the second computing device is configured to query the database to identify the first subset and the second subset based on the one or more parameters and the one or more alternate parameters associated with the one or more parameters.

8. The system of claim 1, wherein the second computing device is configured to determine the one or more alternate parameters associated with the one or more parameters based on a model generated using one or more machine learning algorithms configured to detect one or more changes related to the one or more parameters and determine the one or more alternate parameters associated with the one or more parameters based on the one or more changes being greater than a threshold.

9. The system of claim 1, wherein the first computing device is configured to:
receive the notification; and
display one or more visual markers associated with the modification of the one or more components, the one or more alternate parameters associated with the one or more parameters, or both.

10. The system of claim 9, wherein the one or more visual markers comprise a highlight visualization, a comment box, a link configured to access a memory location, or any combination thereof.

11. A method comprising:
receiving, via at least one processor, a modification to one or more components associated with a first data operation being executed, wherein the first data operation is configured to apply one or more datasets to a function, and wherein the one or more components define the function;
parsing the modification to determine one or more parameters of the one or more components, wherein the one or more parameters are representative of the one or more components;
sending a query request to one or more computing devices to identify, via the at least one processor, a first subset of one or more data processing operations being performed by the one or more computing devices, the first subset include the one or more parameters;
determining, via the at least one processor, one or more alternate parameters associated with the one or more parameters;
sending an additional query request to the one or more computing devices to identify a second subset of the one or more data processing operations being performed by the one or more computing devices, the second subset includes the alternate parameters, wherein the first subset and the second subset are configured to implement the function, and wherein the first subset and the second subset are distinct; and
sending, via the at least one processor, one or more notifications to the one or more computing devices the notification is indicative of the modification, the one or more alternate parameters, the first subset of the data processing operations and the second subsets of data processing operations, wherein the notification is configured to cause the one or more computing devices to implement the modification to one or more additional components associated with the first subset of the data processing operations and the second subset of the data processing operations in response to receiving the notification.

12. The method of claim 11, wherein the one or more data processing operations comprise one or more batch processing operations.

13. The method of claim 11, comprising determining, via the at least one processor, the one or more alternate parameters based on a model generated using one or more machine learning algorithms configured to detect one or more changes related to the one or more parameters and determine the one or more alternate parameters associated with the one or more parameters based on the one or more changes being greater than a threshold.

14. The method of claim 13, wherein the model comprises one or more relationships between the one or more components and the one or more alternate parameters.

15. A non-transitory computer-readable medium comprising computer-executable instructions that, when executed, are configured to cause a processor to perform operations comprising:
receiving a modification to one or more components associated with a first data operation being executed, wherein the first data operation is configured to apply one or more datasets to a function, and wherein the one or more components define the function;
parsing the modification to determine one or more parameters of the one or more components, wherein the one or more parameters are representative of the one or more components;
sending a query request to one or more computing devices to identify a first subset of one or more data processing operations based on the one or more parameters;
determining one or more alternate parameters associated with the one or more parameters;
sending an additional query request to the one or more computing devices to identify a second subset of the one or more data processing operations based on one or more alternate parameters, wherein the second subset and the first subset are configured to implement the function, and wherein the second subset and the first subset are distinct; and
sending one or more notifications to the one or more computing devices the notification is indicative of the modification, the one or more alternate parameters, and the one or more data processing operations, wherein the notification is configured to cause the one or more computing devices to implement the modification to one or more additional components associated with the first subset and the second subset in response to receiving the notification.

16. The non-transitory computer-readable medium of claim 15, wherein the one or more data processing operations comprise one or more batch processing operations.

17. The non-transitory computer-readable medium of claim 15, wherein the computer-executable instructions that, when executed, are configured to cause the processor to perform the operations comprising determining the one or more alternate parameters based on a model generated using one or more machine learning algorithms configured to detect one or more changes related to the one or more parameters and determine the one or more alternate parameters associated with the one or more parameters based on the one or more changes being greater than a threshold.

18. The non-transitory computer-readable medium of claim 17, wherein the model comprises one or more relationships between the one or more components and the one or more alternate parameters.

19. The non-transitory computer-readable medium of claim 15, wherein the one or more alternate parameters comprise a modified version of a name that corresponds to each of the one or more components.

* * * * *